Figure 1:
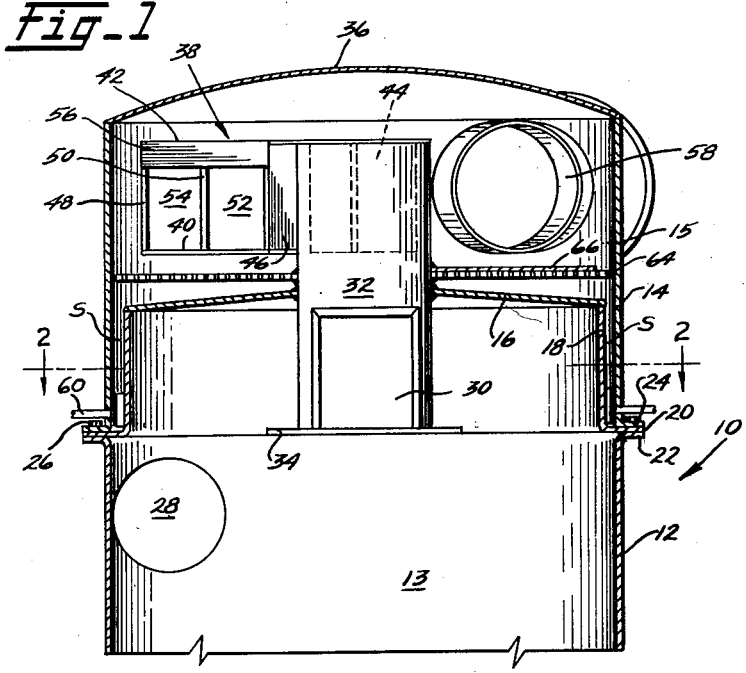

INVENTOR.
ROLAND B BOURNE

United States Patent Office 2,759,559
Patented Aug. 21, 1956

2,759,559

STEAM AND WATER SEPARATOR FOR A SALT WATER DISTILLING PLANT

Roland B. Bourne, West Hartford, Conn., assignor to The Maxim Silencer Company, Hartford, Conn., a corporation of Connecticut Original application July 31, 1953, Serial No. 371,577. Divided and this application October 22, 1954, Serial No. 464,014

2 Claims. (Cl. 183—82)

This invention relates to a sea water distilling plant and, more specifically, to a steam and water separator for such a plant. This application comprises a division of my co-pending application entitled Steam and Water Separator for Sea Water Evaporators or the like, Serial No. 371,577, filed July 31, 1953.

While there are several specific types of salt water distilling plants, oftentimes referred to as "sea water evaporators," which are capable of high capacity performance in providing a fresh water distillate of high purity, the efficiency of the plants depends to a large extent upon the stability of the installation. That is, high efficiency may be expected in a shipboard installation in calm seas, but efficiency is known to suffer in proportion to the amount of pitch and/or roll of the ship in rough seas. Efficiency also suffers without pitch or roll if the vessel rests in a tilted position, as may be the case with a submerged submarine.

The tilting, rolling, and/or pitching of the ship, and thus the evaporator, causes salt laden water to be splashed into or otherwise mixed with the dry steam from which the distillate is taken. In the operation of a sea water evaporator, salt-carrying water is separated from a wet steam mixture to provide dry steam which is condensed to produce the fresh water distillate. Obviously, if the sea water evaporator is tilted so that the separated water or a portion thereof is permitted to mix with the steam and to be carried over into the condenser, the resulting distillate is relatively impure.

It is the general object of this invention to provide a sea water evaporator for shipboard installation which will be highly efficient in the production of a fresh water distillate under the most severe of anticipated operating conditions.

A more specific object of the invention is to provide a sea water evaporator which will continue to provide high quality and quantity performance even though tilted at an angle in excess of 45° from the normal and even when subjected to frequent and violent changes in position, as may be the case in a shipboard installation when the vessel is subjected to violent rolling and/or pitching.

It is a feature of construction in a sea water evaporator incorporating this invention that such an evaporator may be installed on board ship without regard to location. That is, a sea water evaporator constructed in accordance with this invention need not be located in that portion of a vessel where the rolling and/or pitching is least noticeable.

Another feature of an evaporator constructed in accordance with this invention resides in the ease with which the evaporator may be assembled and disassembled in restricted spaces. This feature permits installation of the evaporator where head room is severely limited and permits installation of the associated equipment, such as the condenser, etc., with the least amount of difficulty and with simplified connection to the evaporator.

Figure 2:
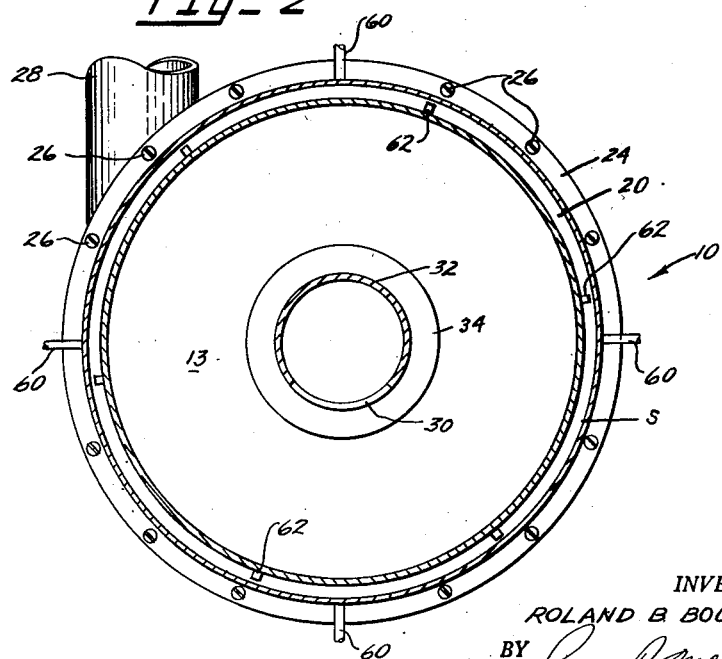

Other objects and features of the invention will become apparent to those skilled in the art from the following description taken in connection with the annexed drawing wherein, Fig. 1 is a vertical cross-sectional view taken through the primary and secondary separating chambers of a sea water evaporator, parts thereof being shown in elevation; and Fig. 2 is a horizontal cross-sectional view taken as indicated by the line 2—2 of Fig. 1.

It is a known practice to provide in a sea water evaporator three distinct chambers within a substantially vertical shell, said chambers comprising in bottom-to-top order a boiler chamber, a primary separating chamber and a secondary separating chamber. The sea water is heated in the boiler chamber and wet steam vapors are driven off. The wet steam is then directed into the primary separating chamber and is whirled therewithin so that a large portion of the salt retaining water droplets entrained in the wet steam mixture are separated therefrom by centrifugal force. The relatively dry steam is then collected in the central portion of the primary separating chamber and introduced in a whirling stream to the secondary separating chamber. In the secondary separating chamber additional water separation is effected by centrifugal force. Then the dry steam is directed out of the evaporator to a condenser to produce the fresh water distillate.

Since the specific improvements of this invention relate to the secondary separator, it is believed that a detailed description and explanation of the operation of the boiler and primary separator are unnecessary. In this connection it should be understood that the secondary separator of this invention may be used in an evaporator construction employing a boiler and primary separator of the type shown in the Williamson et al. Patent 2,604,957 or in Williamson et al. Patent 2,649,408 to which reference may be had to supplement the present description.

In the accompanying drawing there is shown a sea water evaporator 10 having a two-part cylindrical shell, the lower part 12 of which is broken away to show only the upper portion of the primary separating chamber 13. The upper part 14 of the shell surrounds or defines the secondary separating chamber 15. The lower or primary separating chamber 13 and the upper or secondary separating chamber 15 are separated and further defined by a transverse wall or partition 16 extending across and secured to a shell 18 which is spaced inwardly from the top part 14 of the evaporator shell and which projects upwardly a substantial distance therein. The bottom end of the inner shell 18 is provided with a radially outwardly extending flange 20 which may be formed integrally with the inner shell 18 or which may comprise a ring secured thereto as by welding or the like. The flange 20 is secured between a flange 22 provided on the bottom part 12 of the evaporator shell and a flange 24 provided on the top part 14 of the said evaporator shell. The flanges 20, 22 and 24 are connected together as by a plurality of circumferentially spaced bolts 26, 26 and suitable gaskets may be provided to make the flange connection air-tight and water-tight.

Before proceeding to a detailed consideration of the improvements in the secondary separating chamber, it should be observed that an inlet conduit 28 is provided for the primary separating chamber 13 and extends tangentially therefrom. As best shown in the Williamson et al. Patent 2,649,408, the tangential conduit 28 is connected to the boiler chamber (not shown) and receives the wet stream vapors of sea water, which vapors are introduced in a tantential stream to the upper part of the primary separating chamber 13. In whirling within the primary separating chamber 13, water droplets entrained within the steam will be thrown outwardly by centrifugal force and collect on the shell wall 12. The water will, of course, flow down the shell 12 and can be collected in a sea water-supply reservoir provided in the lower portion of the separating chamber adjacent the boiler chamber. The lighter, relatively dry steam will collect in the central portion of the primary separating chamber 13 but will still whirl therewithin. This stream of relatively dry steam will enter a side window or opening 30 provided in a centrally located vertically disposed conduit 32. The conduit 32 is closed at its bottom end by a plate 34 which lies in substantially the same plane as the flange 20 on the bottom end of the inner shell 18.

It is important to observe that the vertical conduit 32 is welded in a central opening in the partition 16 which forms the top header for the inner shell 18 and it is also important to note that the said conduit 32 extends upwardly into the upper or secondary separating chamber 15.

As previously mentioned, the upper or secondary separating chamber 15 is defined above the transverse wall 16 closing the inner shell 18 and is also defined within the upper cylindrical part 14 of the evaporator shell. The said secondary separating chamber is further defined by a curved end header 36 which is secured as by welding or the like across the top of the outer shell with its concave surface facing downwardly. As has also been mentioned, final water and steam separation takes place in the secondary separating chamber 15 by whirling the relatively dry stream therewithin so that the water droplets can be separated from the mixture by centrifugal force.

The means for whirling the relatively dry steam within the secondary separating chamber 15 comprises a volute conduit 38 which is connected to the vertical conduit 32 extending into the secondary separating chamber from the primary separating chamber. The volute conduit, whirl inducing means forms an important part of the subject matter of my said co-pending patent application Serial No. 371,577. As fully set forth in said application, the volute conduit 38 is defined by a bottom plate 40 and a top plate 42 both of which are generally semicircular and both of which extend in substantially horizontal planes. The plates 40 and 42 are connected at one side of their respective centers to the vertical conduit 32 at the bottom and at the top, respectively, of a side window discharge opening 44 provided adjacent the top of the said vertical conduit. For convenience in manufacture, the top plate 42 can be employed to cover the top of the vertical conduit as shown in Fig. 1. The volute conduit 38 is further defined by substantially concentrically arranged inner and outer semi-cylindrical walls 46 and 48 which are secured as by welding to the top and bottom plates 40 and 42 along their inner and outer edges respectively. It is preferred that an additional semi-cylindrical wall 50 be provided in substantially concentric relationship to the side walls 46 and 48 and approximately midway therebetween so that two volute passages, namely, an inner passage 52 and an outer passage 54, are defined within the conduit 38.

It will be observed that the volute passages 52 and 54 encompass an arc of approximately 180° within the secondary separating chamber 15 and it will also be observed that the said passages have discharge openings located in a substantially radial plane extending through the vertical conduit 32. A plate 56 is secured to the top plate 42 of the conduit 38 to extend across the discharge openings of the passages 52 and 54 and the plate 56 is inclined so that the relatively dry steam emitting from the said passages will not be directed upwardly so as to strike against the top header 36.

It will be readily understood that the stream of relatively dry steam discharging from the volute conduit 38 will be whirled within the secondary separating chamber 15 so that water droplets entrained within the said stream can be separated by centrifugal force and strike the shell wall 14 at an acute angle. The direction of movement of the whirling stream in the particular embodiment shown in the drawing is counterclockwise when observed from a horizontal plane above the evaporator 10. An outlet conduit 58 projects into the separating chamber 15 in a horizontal plane and extends upstream with respect to the whirling stream or in a clockwise direction with respect to the cylindrical shell. It is important to observe that the outlet conduit 58 has an opening which resides in a substantially radial vertical plane extending through the vertical conduit 32 and it should also be observed that the outlet conduit opening is spaced from the shell wall 14 and from the vertical conduit 32 and from all other walls within the separating chamber 15. This arrangement of the outlet conduit and its opening prevents water creeping from the shell wall into the discharge opening. The said outlet conduit and discharge opening are so arranged that the dry steam from which the water has been separated will enter the discharge conduit without expending an appreciable amount of energy.

In accordance with the present invention, the water collected on the inner surface of the shell wall 14 will drain downwardly into an annular sump S which is defined between the inner shell 18 and the wall 14 of the outer shell. It is important to observe that the sump S is quite deep, the inner shell 18 extending upwardly within the outer shell 14 a substantial distance. It should also be observed that the transverse partition 16 which closes the inner shell 18 is concave downwardly so that any water which may collect on the top of said transverse partition will drain into the deep annular sump S. A plurality (4 shown) of circumferentially spaced radially extending drain pipes 60, 60 project through the outer shell wall 14 to drain the salt laden water from the sump.

It will be readily understood that even with a substantial amount of the water collected in the sump S there is little likelihood of said water splashing upwardly into the separating chamber 15 and becoming re-entrained within the dry steam. The drain pipes 60, 60 will carry the water away at a rate sufficient to keep the water level within the sump S at a preselected maximum. In this connection, it should be understood that as many drain pipes 60, 60 may be supplied as will be necessary to meet anticipated requirements. It will be apparent that even if the evaporator 10 is tilted at a substantial angle, the water will not flow out of the sump into the secondary separating chamber and, even if the evaporator 10 is violently tilted from one position to another, as may occur during pitch and roll of the vessel, the water will not splash into the separating chamber 15. A plurality of vanes 62, 62 are provided on the inner shell wall 18 to extend radially therefrom at the bottom of the sump, the vanes being arranged in circumferentially spaced relationship to prevent splashing within the sump S. In addition, a substantially horizontal perforated circular plate 64 having a central opening surrounding the vertical conduit 32 is secured to the said conduit as by welding or the like to prevent splashing upwardly. Adjacent and below the opening into the discharge conduit 58 a segmental imperforate plate 66 is secured to the vertical conduit 32 to overlie the perforate plate 64 for added protection against splashing of the salt laden water in the area closely adjacent the discharge conduit.

As a result, the evaporator 10 provided in accordance with the present invention can be relied upon for efficient operation aboard ship even though the ship is tilted at a severe angle and even though the ship may be violently pitching and/or rolling in rough seas.

Another important advantage of the aforedescribed structure resides in the arrangement of elements within the upper part 14 of the evaporator shell. More specifically, the inner shell 18 and its end header 16 support the vertical conduit 32, the volute conduit 38, and the anti-splash plates 64 and 66. Since the inner shell 18 is connected between the bottom and top outer shell parts 12 and 14 of the flange 20, and since the bottom end of the vertical conduit 32 does not project below the bottom end of the inner shell 18, the disassembly of the evaporator 10 is simplified. That is, by loosening the flange bolts 26, 26, the dome which comprises the upper part 14 of the evaporator shell and its end header 36, and the inner structure comprising the inner shell 18 and the vertical and volute conduits 32 and 38 can be simultaneously removed from the lower part of the evaporator shell. It is only necessary to move the dome and the inner shell laterally or horizontally to effect removal from the lower part 12 of the evaporator shell. Having removed the dome and the inner shell, the dome can then be raised from the inner shell and the parts serviced or cleaned as desired. Obviously, the evaporator 10 can be installed within limited space and in space where head room is particularly limited.

While the present invention has been described in connection with one specific embodiment shown in the accompanying drawing, it should be understood that the scope of the invention is not to be limited by the drawing or to the one specific embodiment otherwise than indicated by the claims which follow.

I claim as my invention:

1. In a sea water evaporator of the type having a generally cylindrical substantially vertical shell enclosing a primary separating chamber for separating sea water and steam, the improvement comprising a dome detachably connected with the top of the shell, a conduit opening into said dome for discharging steam therefrom, an inner generally cylindrical open-bottom shell having a top end header and having a flange projecting outwardly around its bottom end and detachably connected between the dome and the shell defining the primary separating chamber, the said inner shell projecting a substantial distance upwardly in the said dome but being spaced within the dome to define a secondary separating chamber above said header and to define a deep annular sump around the said inner shell, drain means opening into said sump, and a generally vertical conduit extending through said header to transfer steam from said primary separating chamber to said secondary separating chamber, the said dome and inner shell being horizontally removable from the top of the first mentioned shell.

2. In a sea water evaporator of the type having a generally cylindrical and substantially vertical shell enclosing a primary separating chamber for separating sea water and steam, the improvement comprising a dome detachably connected with the top of the shell and horizontally removable therefrom, a conduit opening into said dome for discharging steam therefrom, an inner generally cylindrical open-bottom shell having a top end header which is concave downwardly and having a flange projecting outwardly around its bottom end and detachably connected between the dome and the first mentioned shell, the said inner shell projecting a substantial distance upwardly in the said dome but being spaced within the dome to define a secondary separating chamber above said header and to define a deep annular sump around the said inner shell, drain means opening into said sump, a generally vertical conduit extending through said header and wholly supported thereby with its bottom end projecting no lower than the bottom of the inner shell, and a perforate anti-splash plate secured to said vertical conduit above said end header and extending over said sump but in spaced relationship to said dome, the said inner shell, vertical conduit and splash plate being removable as a unit with said dome.

References Cited in the file of this patent

UNITED STATES PATENTS

| 825,796 | Bartlett et al. | July 10, 1906 |
| 2,256,524 | McKelvey | Sept. 23, 1941 |
| 2,434,637 | Brister | Jan. 20, 1948 |
| 2,649,408 | Williamson et al. | Aug. 18, 1953 |

FOREIGN PATENTS

| 2,792 | Great Britain | Feb. 4, 1904 |